US005367149A

United States Patent [19]

Takahira

[11] Patent Number: 5,367,149

[45] Date of Patent: Nov. 22, 1994

[54] IC CARD AND METHOD OF CHECKING PERSONAL IDENTIFICATION NUMBER OF THE SAME

[75] Inventor: Kenichi Takahira, Itami, Japan

[73] Assignee: Mitsubishi Denki Kabushiki Kaisha, Tokyo, Japan

[21] Appl. No.: 108,221

[22] Filed: Aug. 19, 1993

[30] Foreign Application Priority Data

Aug. 27, 1992 [JP] Japan .................................. 4-250418

[51] Int. Cl.[5] .............................................. G06F 15/30

[52] U.S. Cl. .................................... 235/380; 235/492; 902/5

[58] Field of Search .................... 235/380, 492; 902/4, 902/5

[56] References Cited

U.S. PATENT DOCUMENTS 4,439,670 3/1984 Basset et al. ........................ 235/380
4,839,506 6/1989 Homms et al. ...................... 235/492
4,990,760 2/1991 Tomari et al. ...................... 235/492
5,034,597 7/1991 Atsumi et al. ........................ 235/380
5,157,247 10/1992 Takahira ............................ 235/380

FOREIGN PATENT DOCUMENTS 60-153581 8/1985 Japan .
220460 11/1985 Japan .................................. 235/380
151793 7/1986 Japan .................................. 235/380

*Primary Examiner*—John Shepperd
*Attorney, Agent, or Firm*—Leydig, Voit & Mayer

[57] ABSTRACT

An IC card according to the present invention includes data processing means for processing data; a memory for storing a personal identification number; a power-supply terminal to which a power-supply voltage is applied by an external unit; an input/output terminal for inputting data from and outputting data to the external unit; a voltage detecting circuit for detecting the power-supply voltage applied to the power-supply terminal from the external unit; and a check-processing circuit for verifying a personal identification number input from the external unit by comparison with a personal identification number stored in the memory in response to a command for verifying applied to the input/output terminal when the power-supply voltage detected in the voltage detecting circuit is at least equal to a threshold voltage and constantly responding that an identification error has occurred when the power-supply voltage detected in the voltage detecting circuit is lower than the threshold voltage.

6 Claims, 4 Drawing Sheets

IC CARD AND METHOD OF CHECKING PERSONAL IDENTIFICATION NUMBER OF THE SAME

BACKGROUND OF THE INVENTION

1. Field of the Invention

The present invention relates to an IC card with a built-in microcomputer and memory, and also to a method of checking a personal identification number of the IC card.

2. Description of the Related Art

Recently IC cards which include microcomputers and EEPROMs have been spreading rapidly. One of the reasons for this is that the IC is a single-chip with a single power-supply. Conventionally, one IC including a one-chip microcomputer having general-purpose ROM, RAM, and CPU, and another IC including an EEPROM or an EPROM have been packaged independently on a substrate as an IC module. However, according to improvements in semiconductor manufacturing technology, a single-chip configuration can be achieved by integrating the EEPROM into the IC which includes the one-chip microcomputer. In addition, although an independent power supply for writing was required in the past, an IC having a single power-supply can be successfully obtained by incorporating a boosting circuit in the IC circuit.

FIG. 3 is a block diagram showing the IC card according to the prior art, in which reference numeral 1 represents a CPU which comprises a clock generating circuit 2, a processor status register 3, program counters 4 and 5, a stack pointer 6, a prescaler 7, a timer 8, an instruction register 9, an instruction decoder 10, an 8-bit ALU 11, an accumulator 12, and index registers 13 and 14.

Reference numeral 15 represents an EEPROM which stores variable data such as a personal identification number. Numeral 16 represents a RAM which temporarily stores data. Numeral 17 represents a ROM which stores invariate data such as a program. Numeral 18 is an input/output part which inputs and outputs data to an external terminal unit. Numerals 19 and 20 represent a data bus and an address bus respectively. CLK denotes a terminal which provides an operating clock from an external part to the clock circuit 2. RST denotes a terminal which provides a reset signal to initialize the CPU 1. Vcc, GND, and I/O denote a terminal to which the power-supply voltage is applied, a grounding terminal, and an input/output terminal in the input/output part 18 respectively.

FIG. 4 is a block diagram showing a configuration of the EEPROM 15, in which: reference numeral 21 represents an EEPROM memory array comprising EEPROM memory cells each having an ELOTOX structure or a MNOS structure; numeral 22 represents an address latch which retains an address signal for reading/writing information in the EEPROM memory array 21; numeral 23 represents a data latch which temporarily retains written information; numeral 24 represents a sense amplifier which converts a signal, read out from the EEPROM memory array 21, into a 0/1 digital signal to output to the data bus 19; and numeral 25 represents a high-voltage generating circuit which generates a high voltage required for writing information on the EEPROM memory array 21 to which the generated high voltage is applied.

A description of the operation of the IC card will now be given.

In the ROM 17 of the IC card, an application program, programmed based upon the specification of each user (e.g.,the person to whom a card is issued), is stored. When the IC card is connected to the terminal unit, the objective application system can be operated by execution of the application program by the CPU 1 when the required power and signals are supplied.

Most of the various kinds of information used by an application system of the IC card is stored in the rewritable EEPROM 15. For instance, the following information can be stored in the EEPROM 15, e.g., a personal identification number, or a PIN number, to verify the personal identification, a mutual verification key and a secret-coding/decoding key of a terminal or the like, and transaction recording, all of which are usually rewritten or additionally written upon request.

In the EEPROM 15 as shown in FIG. 4, the high-voltage generating circuit 25 is designed to boost the power-supply voltage, which is supplied from the Vcc terminal, by a charge pump circuit or the like. An output voltage generated in the high-voltage generating circuit 25 greatly depends upon the voltage at the Vcc terminal. Accordingly, when the voltage at the Vcc terminal is decreased, the output voltage of the high-voltage generating circuit 25 drops so that sufficient voltage to write in the memory cell cannot be obtained. Generally, the IC card is designed to be operated at 5 V 0%. However, when the power-supply voltage is decreased, the characteristic property of the high-voltage generating circuit 25 is affected, and thus the writing-system circuit in the EEPROM 15 cannot perform its function properly.

As the conventional IC card is generally configured in the above mentioned manner, when the power-supply voltage is decreased, a power-supply voltage area can be formed where the CPU 1, the ROM 17, and the RAM 16 perform properly but the writing-system circuit in the EEPROM 15 cannot perform its function. In a generally employed method of verifying the personal identification by using the IC card in the application system, PIN numbers can be stored in a predetermined area in the EEPROM 15 of the IC card and the number can be verified.

A flag is provided in advance in the EEPROM 15 so as to automatically lock operation of the IC card when the number of identification errors exceeds a predetermined number. The verification is conducted by the CPU 1 in the IC card, and the CPU 1 can write the number of identification errors in a separate predetermined-area in the EEPROM 15. Accordingly, an illicit use of cards can be prevented by setting the flag so that it can execute writing in the EEPROM 15 when the number of identification errors exceeds the predetermined number. The above-mentioned checking method can be used as a method having a high security because: the original PIN number cannot be output to the outside of the IC card; the number of identification errors can be updated in the EEPROM 15 by the IC card itself; and means for automatically locking operation of using the IC card is provided.

However, the writing-system circuit in the EEPROM 15 cannot function when the power-supply voltage is decreased on purpose as described before. In this case, although the above-mentioned verification can be executed normally, updating the number of identification errors in the EEPROM 15 and automatic locking of the operation cannot be executed. Accordingly, there has been a problem in that only the results of the checking verification can be output to the outside of the IC card and, therefore, the original PIN number may be divulged by allowing repeated checking of the PIN number.

SUMMARY OF THE INVENTION

In order to overcome the above described problems, the present invention provides an IC card and a method of checking a personal identification number, or a PIN number, wherein an original PIN number stored in the IC card cannot be divulged even if the PIN number is checked when the power-supply voltage is decreased on purpose.

An IC card according to the present invention comprises: data processing means for processing data; a memory which stores in advance a personal identification number; a power-supply terminal to which a power-supply voltage is applied from an external unit; an input/output terminal which inputs and outputs data from and to the external unit; a voltage detecting circuit which detects the power-supply voltage applied to on the power-supply terminal from the external unit; and check-processing means for executing a verification of a personal identification number input from the external unit by comparison with a personal identification number stored in the memory in accordance with an input of a directive command for verifying the identification number from the external unit via the input/output terminal when the power-supply voltage detected in the voltage detecting circuit is equal to or higher than a predetermined value, while the check-processing means, on the other hand, constantly executes an operation of reporting identification errors to the external unit in accordance with an input of a directive command for verifying the identification number from the external unit via the input/output terminal when the power-supply voltage detected in the voltage detecting circuit is lower than the predetermined value.

In addition, a method of checking a personal identification number in an IC card according to the present invention comprises the steps of: writing predetermined dummy data in a memory when a directive command to check a personal identification number is input from an external unit; reading out dummy data from the memory; determining whether a normal writing was conducted by comparing the read-out dummy data with the written dummy data; checking the identification number input from the external unit by comparison with a personal identification number stored in advance in the memory, when it has been determined that a normal writing was conducted; and constantly reporting an identification error to the external unit when it has been determined that writing was abnormal.

DESCRIPTION OF THE PREFERRED EMBODIMENTS

A detailed description of preferred embodiments of the given in present invention will now be conjunction with the accompanying drawings.

Figure 1:
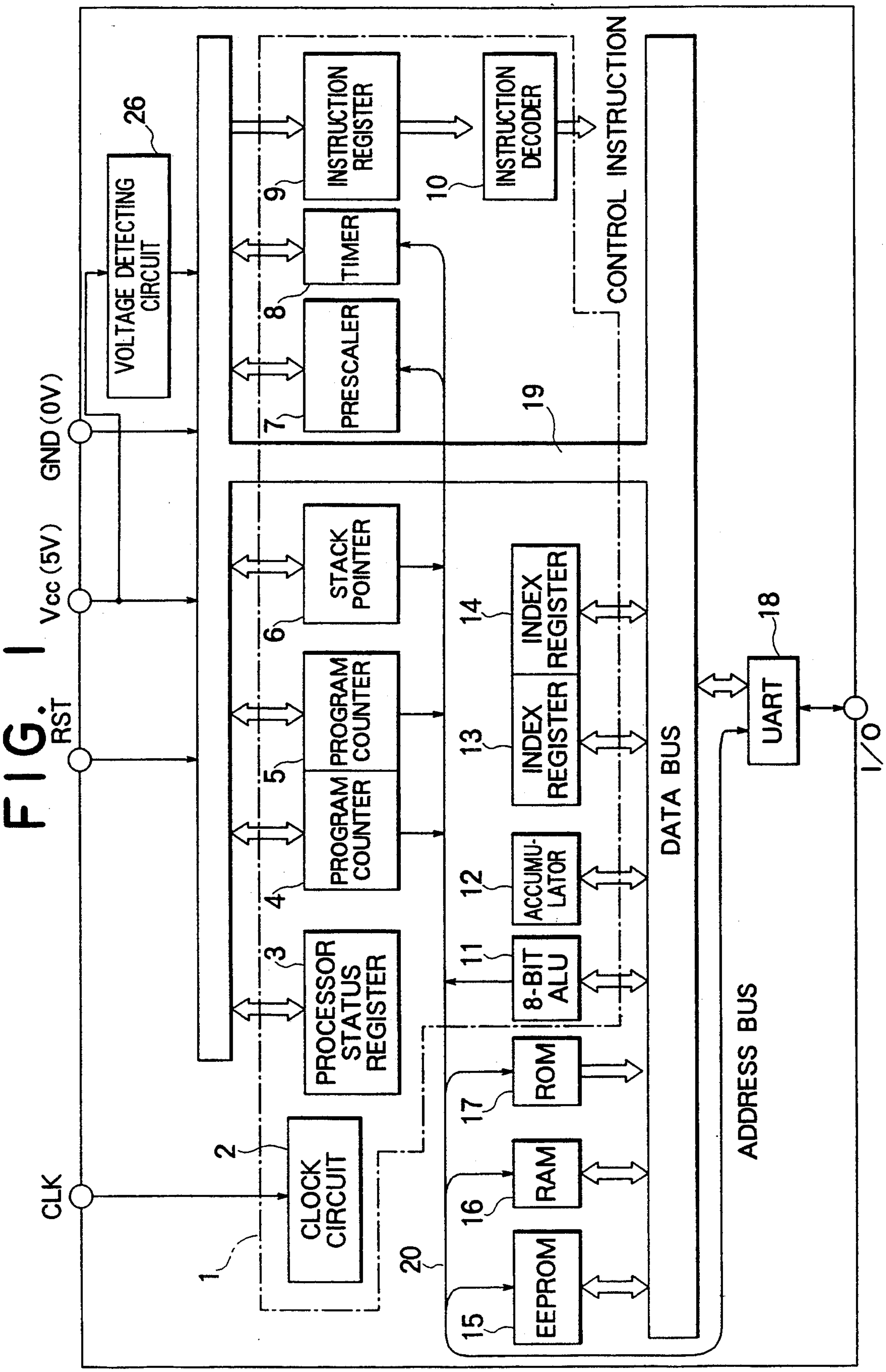
FIG. 1 is a block diagram of a first embodiment of an IC card according to the present invention.
Figure 3:
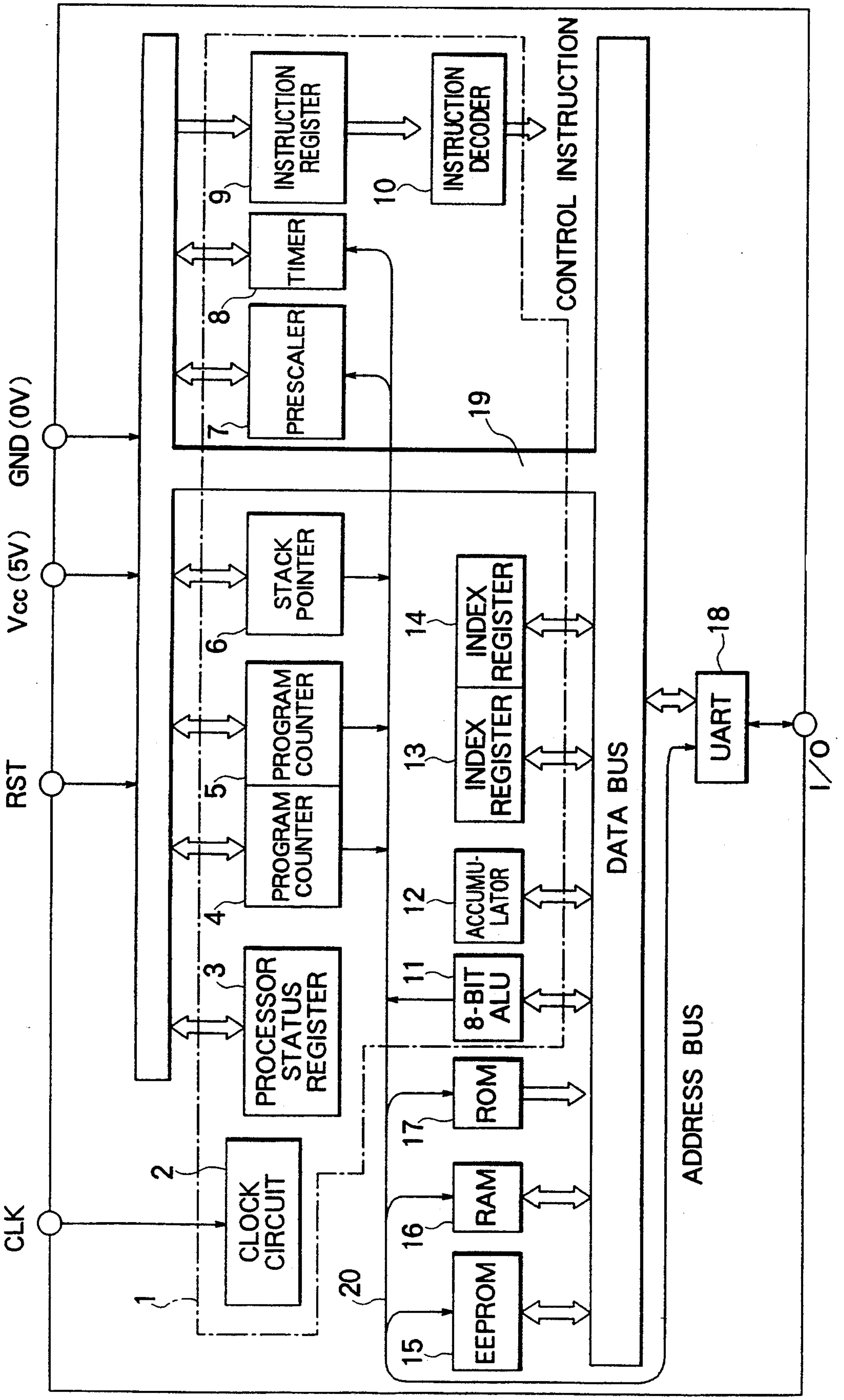
FIG. 3 PRIOR ART
FIG. 3 is a block diagram of a conventional IC card.
Figure 4:
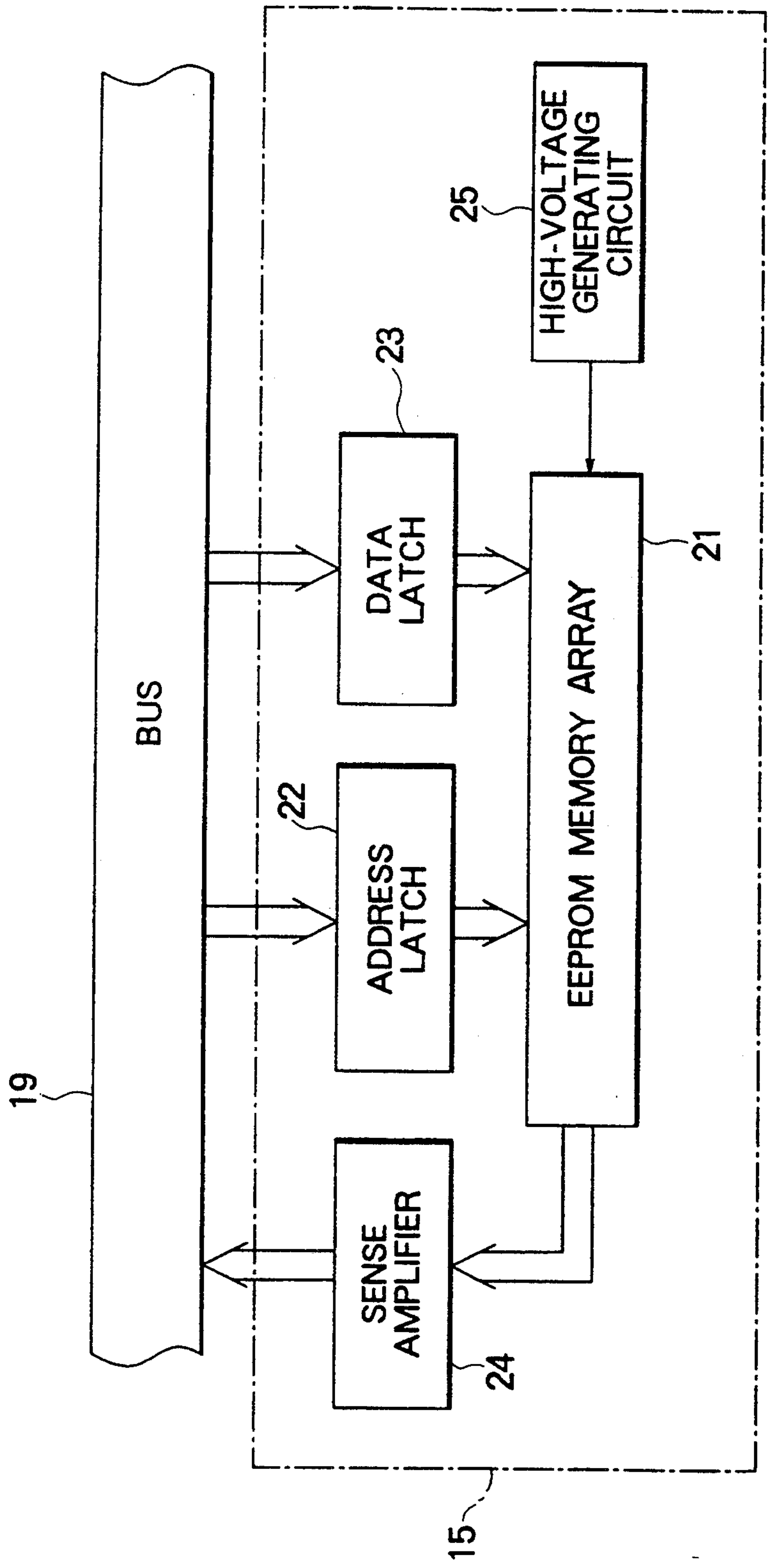
FIG. 4 PRIOR ART
FIG. 4 is a block diagram showing an EEPROM provided in the conventional IC card.

Embodiment 1:

In FIG. 1 showing the present invention and FIG. 3 showing the related art, identical reference numerals indicate identical parts of an IC card.

The IC card of a preferred embodiment comprises a CPU 1; and an EEPROM 15, a RAM 16, ROM 17, and a UART 18 which are connected to the CPU 1 via a data bus 19. The CPU 1 comprises a clock generating circuit 2, a processor status register 3, program counters 4 and 5, a stack pointer 6, a prescaler 7, a timer 8, an instruction register 9, an instruction decoder 10, an 8-bit ALU 11, an accumulator 12, and index registers 13 and 14. In addition, the IC card is provided with a voltage detecting circuit 26 connected to a Vcc terminal.

The voltage detecting circuit 26 is a circuit which detects a power-supply voltage applied to the Vcc terminal. The circuit 26 outputs a high-level signal to the data bus 19 when the power-supply voltage is equal to or higher than a predetermined level, and outputs a low-level signal to the data bus 19 when this voltage is lower than the predetermined level.

The following is a description of operation of the IC card. The IC card is fitted in a terminal unit such as an interface unit, not shown to activate the IC card. When the predetermined power-supply voltage is applied to the Vcc terminal of the IC card, the high-level signal is output from the voltage detecting circuit 26. When the CPU 1 recognizes the output of the high-level signal from the voltage detecting circuit 26 via the data bus 19, the CPU 1 interprets a command signal input from the terminal unit via an I/O terminal to move to a processing mode commanded by the command signal. As means for recognizing the transition, a recognizing flag for the transition, for example, can be prepared at a predetermined area in the RAM 16. The flag is set at the transition while the command processing is being executed.

When receiving the command signal which commands the checking of a personal identification number from the terminal unit, the CPU 1 recognizes that the transition flag in the RAM 16 is being set, and simultaneously recognizes the output of the voltage detecting circuit 26 again. When the output from the voltage detecting circuit 26 is at a high level, the CPU 1 executes the normal checking processing. On the other hand, when the output is at a low level, a pseudo-processing for checking is executed unconditionally. In this pseudo-processing, the checking decision is conducted in accordance with the same content as in the normal checking processing. In that case, the decision result is an "identification error" which is always presented regardless of the checking result. Accordingly, the pseudo-processing is seemingly the same as the normal checking processing, but the decision result is defined as the "identification error."

The number of identification errors resulting from the pseudo-processing is counted each time and stored in the RAM 16. The number of error-occurrences stored in the RAM 16 is compared with the predetermined number by the CPU 1. When this number exceeds the predetermined number, the CPU 1 stops or prohibits the execution of any subsequent command processing.

Consequently, even when power-supply voltage is dropped on purpose to check the PIN number, the original PIN number cannot be divulged due to the constant response of the "identification error."

Embodiment 2:

According to a second embodiment, a method of checking the PIN number, in which the conventional IC card shown in FIG. 3 is used, can also provide security as high as the first embodiment. In the method of the second embodiment, before the command processing for PIN checking is executed, dummy data is written in a preset dummy writing-area in an EEPROM 15. The dummy data is verified to determine the possibility of writing in the EEPROM 15. When the resultant decision indicates the impossibility of writing, the pseudo-processing for checking is executed in the same manner as the first embodiment.

It is preferable for the conditions of the dummy-writing method to be stricter than ordinary data-writing. One method is lowering the output from a high-voltage generation circuit 25 in the EEPROM 15. For example, the high-voltage generation circuit 25 having two kinds of output levels may be provided to lower the output during the dummy writing as compared with the output during ordinary writing. The method may also vary the output from the high-voltage generation circuit 25 under control of the CPU 1.

There are other methods of making the reading-out conditions after the dummy writing strict. One method is to decrease the level of sensitivity by making the cell load a larger memory cell which conducts the dummy writing; and another method is to provide means for applying a voltage to make the voltage level conditions stricter than that of the ordinary level.

There are two kinds of dummy data for writing. One type of data is fixed data and the other type is variable data which varies the content every time when data is written. These two different data can be written successively. The fixed data can be used to recognize the operation of the reading side employing the "0"/"1" bit-column as a checker pattern. When the reading side becomes abnormal, the reading data is fixed to "0" or "1". Thus, the abnormality can be detected. The variable data can be set each time so that the data becomes different from the previously written data. For instance, after verification of the previous content, a number calculated by adding 1 to the previous content is written. Accordingly, the writing abnormality can be detected because different data from the previously written data is written.

Figure 2:
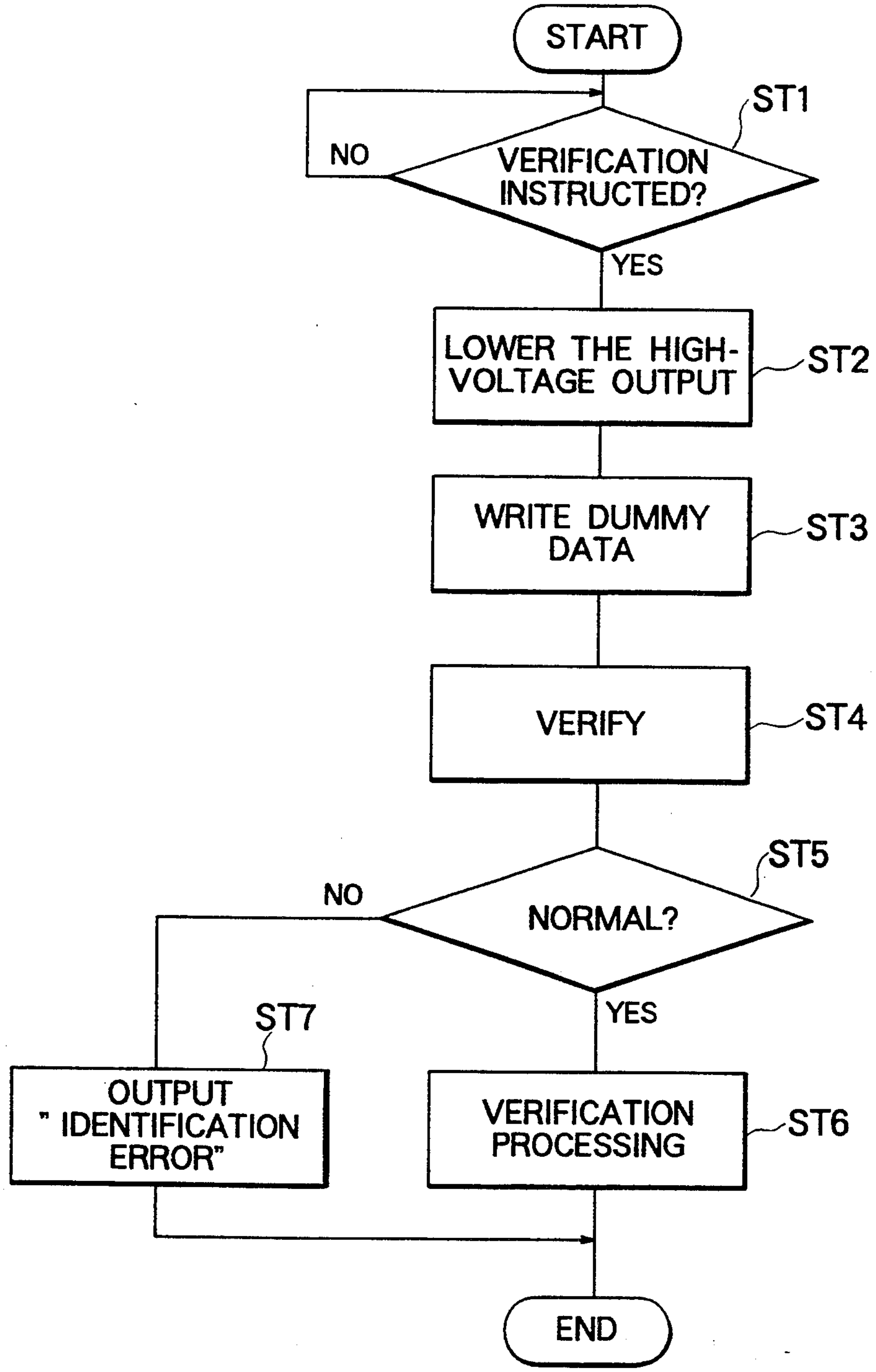
FIG. 2 is a flow chart showing an operation of a second embodiment according to the present invention.

FIG. 2 is a flow chart showing an operation of the second embodiment.

It is decided in step ST1 whether there has been a command to check the PIN number. If there is such a command, the output voltage of the high-voltage generating circuit 25 can be reduced in step ST2. Subsequently, in step ST3, predetermined dummy data is written in the predetermined area of the EEPROM 15. In a step ST4, the written dummy data is read out to verify whether the dummy data is written properly. When it is verified that the dummy data is written properly in step ST5, the normal checking processing can be executed in step ST6. When it is verified that the written data is abnormal in step ST5, it is regarded as an abnormality of the power-supply voltage. Consequently, "identification error" is output by conducting the pseudo-processing for checking in step ST7 in the same manner as in the first embodiment.

In the second embodiment, the abnormality of the power-supply voltage can be detected by means of writing and verifying the dummy data even if the IC card does not have the voltage detecting circuit which is included in the first embodiment. Subsequently, an operation of reporting "identification error" can be conducted when a detection result of an abnormality is obtained. Consequently, even when the power-supply voltage is dropped on purpose to discover the PIN number, the original PIN number is not divulged due to the constant reporting of an "identification error."

What is claimed is:

1. An IC card comprising:

data processing means for processing data;

a memory in which a personal identification number is stored;

a power-supply terminal to which a power-supply voltage is applied from an external unit;

an input/output terminal for inputting data from and outputting data to the external unit;

a voltage detecting circuit for detecting the power-supply voltage applied to said power-supply terminal from the external unit; and check-processing means for verifying a personal identification number input from the external unit by comparison with the personal identification number stored in said memory in response to a command for verifying the identification number from the external unit applied to said input/output terminal when the power-supply voltage detected by said voltage detecting circuit is at least a predetermined threshold voltage, said check-processing means constantly responding to the command that an error occurred in the comparison when the power-supply voltage detected in said voltage detecting circuit is lower than the predetermined threshold voltage.

2. The IC card according to claim 1 wherein said memory is an EEPROM.

3. The IC card according to claim 2 comprising a RAM for storing data temporarily and a ROM for storing a program for operating said CPU.

4. The IC card according to claim 1 wherein said check-processing means repeatedly responds to the command that an error occurred when the power-supply voltage detected in said voltage detecting circuit is lower than the threshold voltage.

5. A method of checking a personal identification number in an IC card, said method comprising:

writing predetermined dummy data in a memory in an IC card in response to a command to check a personal identification number input to the IC card from an external unit;

reading out from the memory the dummy data written into the memory;

determining whether accurate writing occurred by comparing the read-out dummy data with the written-in dummy data;

checking an identification number input from the external unit in the IC card by comparison with a personal identification number stored in the memory in the IC card, upon determination that accurate writing occurred; and constantly responding to the external unit that an identification error has occurred upon determination that accurate writing has not occurred.

6. The method according to claim 5, wherein the dummy data written in the memory comprises fixed data for verifying the reading-out operation and variable data for verifying the writing-in operation.

* * * * *